United States Patent Office 3,407,645
Patented Oct. 29, 1968

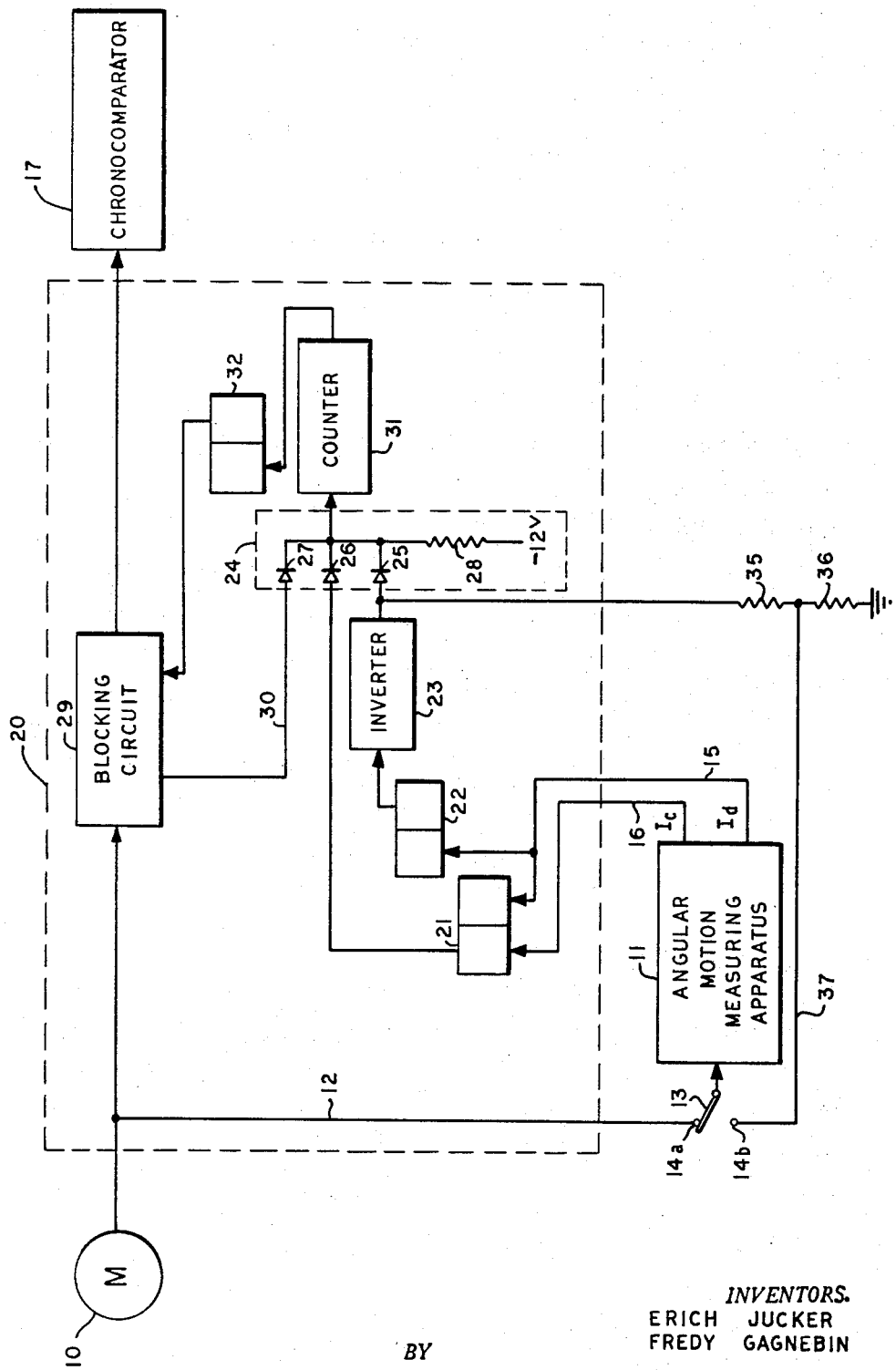

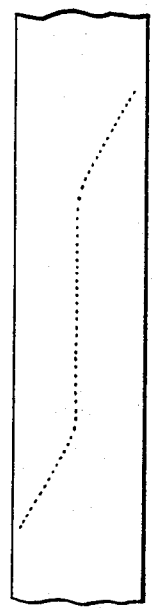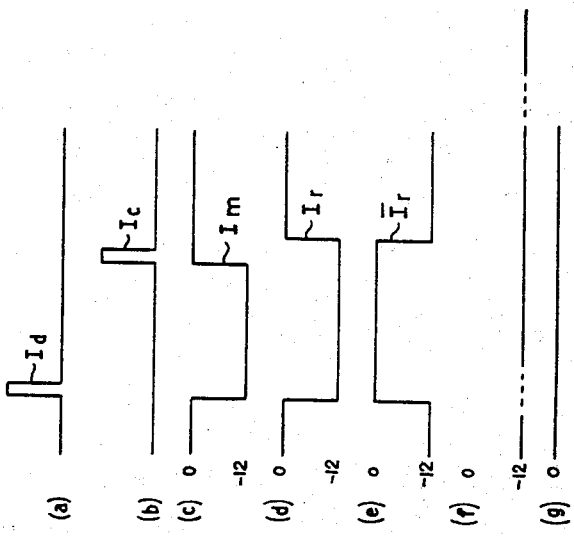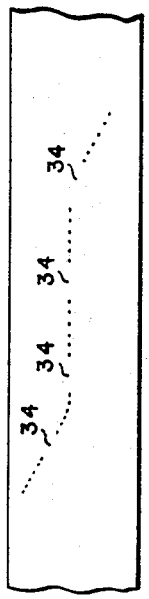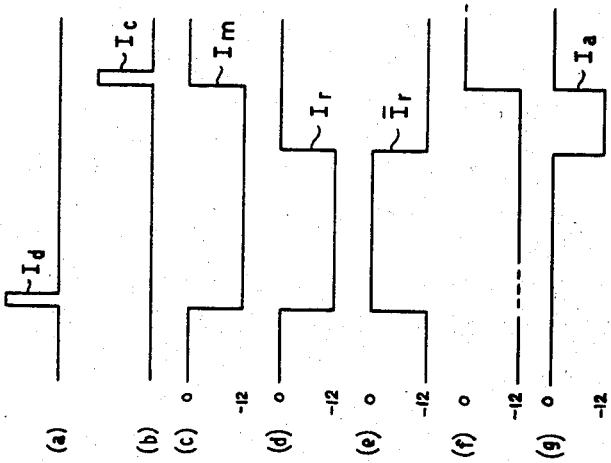

3,407,645
TIMEPIECE TESTING APPARATUS
Erich Jucker and Fredy Gagnebin, La Chaux-de-Fonds, Switzerland, assignors to Portescap, Le Porte-Echappement Universel S.A., La Chaux-de-Fonds, Switzerland
Filed Jan. 3, 1966, Ser. No. 518,470
Claims priority, application Switzerland, Jan. 13, 1965, 539/65
9 Claims. (Cl. 73—6)

ABSTRACT OF THE DISCLOSURE

The testing apparatus provides visual indications of both the rate and amplitude of oscillation of the balance wheel of a watch, both indications being represented on a single chart so that a single operator can observe both indications simultaneously. A chronocomparator, which produces a linear marking on a chart, is used to measure the oscillation rate. An angular motion measurement device is used to measure the angular swing of the balance wheel. If the angular swing falls below a certain predetermined level, an electrical signal is developed which blocks the flow of measurement signals to the chronocomparator for a certain length of time. This produces blank portions in the otherwise continuous chronocomparator line on the graph, and tells the operator that the oscillation amplitude of the balance wheel is unsatisfactory.

---

The present invention relates, in general, to the testing of timepieces and, in particular, to apparatus which provides a readily discernible indication of when the angular motion or swing of the oscillating member of a timepiece is less than necessary for the timepiece to keep proper time. Although the invention will be described in connection with the testing of the balance wheel of a watch, it will be readily apparent that the invention may be employed in testing other types of timepieces.

In theory, the rate of a watch movement is independent of the angular swing of the balance wheel. Ideally, the frequency of an oscillating member is dependent only upon its own physical characteristics. In practice, however, an inadequate swing of the balance wheel is a sign that the rate of the balance wheel is already too low or that it may be expected to become too low. One of the more common causes of such an inadequate angular swing is the aging of the lubricant used in the watch movement. As the lubricant becomes more gummy, the frictional forces increase and the angular motion of the balance wheel decreases. The rate of the balance wheel also decreases and eventually, the watch movement will stop entirely.

It is, therefore, frequently necessary to measure the angular swing of the balance wheel in addition to measuring the rate of the balance wheel. A chronocomparator is commonly used to measure and record the rate of the balance wheel. Angular motion measuring equipment has been previously developed which provides a measure of such movements of the balance wheel.

It is a common practice in watch testing facilities to have a single operator monitor a number of test stations at which a number of watch movements are being tested simultaneously. Generally, each test station is provided with at least a chronocomparator to measure the rate of the balance wheel. If, however, the angular swing of the balance wheel is also to be measured, additional equipment for performing this function must also be provided. By adding this equipment, the number of instruments which the operator must monitor is effectively doubled since the operator must examine all the chronocomparator recordings to check the rates of the movements being tested and he must also check the instruments which indicate the amount of angular motion.

Oftentimes, it is only necessary to determine if the angular swing extends to a prescribed point without knowing the actual amount of angular motion. The present invention relates to a testing technique in which it is sufficient to know that a balance wheel under test either does or does not have an adequate angular swing without knowing the actual amount of this movement.

It is an object of the present invention to provide new and improved timepiece testing apparatus.

It is another object of the present invention to provide apparatus which produces readily discernible visual indications of inadequate angular swings of a balance wheel.

It is a further object of the present invention to provide timepiece testing equipment for producing readily discernible visual indications of both the rate of a balance wheel and inadequate angular motions of a balance wheel so that a single operator may monitor a number of such testing devices with relative ease and simplicity.

It is a still further object of the present invention to provide timepiece testing apparatus which is relatively simple in construction and inexpensive in cost.

The desired visual indications of inadequate angular swings of a balance wheel are developed by the present invention by automatically intermittently interrupting the rate measurement being performed, for example, by a chronocomparator when the angular swing of the balance wheel under test is inadequate. This causes spaces in the chronocomparator rate recordings with the spaces signifying that the angular motion of the balance wheel under test is inadequate. If the angular motion is adequate, the chronocomparator rate recordings are in the usual form of a continuous series of dots. The interruptions in the rate measurements are achieved by developing a measurement of the angular swing of the balance wheel under test and comparing this measurement with a standard which corresponds to an adequate angular swing of the balance wheel. If the measured angular swing of the balance wheel is inadequate, a control circuit prevents the chronocomparator from measuring the rate of the timepiece under test. This condition is maintained for a prescribed duration after which the chronocomparator resumes normal operation. During the time that the chronocomparator is prevented from making the rate measurements, no rate recordings are developed. This results in readily discernible spaces in the chronocomparator rate recordings.

For a better understanding of the present invention, together with other and further objects thereof, reference is made to the following description, taken in connection with the accompanying drawings, and its scope will be pointed out in the appended claims.

Referring to the drawings:

FIGURE 1 is a circuit diagram of a preferred embodiment of timepiece testing apparatus constructed in accordance with the present invention;

FIGURES 2a and 2b show waveforms which are useful in understanding the operation of the apparatus of FIGURE 1; and FIGURES 3a and 3b, respectively, show chronocomparator recordings developed by inadequate and adequate angular swings of a balance wheel.

Referring to FIGURE 1, a microphone 10, responsive to the sounds produced by a timepiece movement under test, develops electrical signals representative of these sounds. The microphone 10 may be similar to the one shown in U.S. Patent 3,026,707 to F. Marti et al. This microphone is provided with means for holding a watch movement in a number of different test positions. The microphone 10 senses the sounds of the movement and develops electrical signals in response to the sounds for each of the various test positions of the movement.

The sounds of the watch movement are produced as the balance wheel swings back and forth. One of the sounds, commonly called the "unlocking" sound, is produced by the impact of the roller-pin against one edge of the lever-notch. The next sound, commonly called the "impulse" sound, is produced by the impact of the escape-wheel tooth on the impulse-plane of one of the lifts. The last sound, commonly called the "drop" sound, is composed of two sounds which are produced simultaneously by the drop of the escape-wheel tooth on the locking-plane of the second lift, and by the projection of the fork lever against one of the banking-pins.

Also included in the apparatus in FIGURE 1 is angular motion measuring apparatus 11, of conventional construction and operation, to which the electrical signals developed by the microphone 10 are supplied. Specifically, the electrical signals from the microphone 10 are supplied along a wire 12 and through a switch 13 to the angular motion measuring apparatus 11 when the switch 13 is positioned in contact with a terminal 14a as illustrated. The angular motion measuring apparatus 11 is selectively responsive to those electrical signals developed by the microphone 10 which are representative of the unlocking and drop sounds and develops, in the usual manner, an indication of the amount of angular swing of the balance wheel under test. Briefly, this is accomplished as follows. Since the time required for the balance wheel to swing from one of its extreme positions to the other theoretically is dependent only upon its own physical characteristics and remains constant regardless of the extent of its angular motion, the greater the actual angular motion, the greater the linear speed of the balance wheel and the shorter the time required for the balance wheel to traverse a prescribed sector of its swing. The unlocking and drop sounds occur at the beginning and end of a prescribed sector of the angular swing of the balance wheel. Thus, by measuring the time interval between the occurrence of the unlocking and drop sounds, an indication of the extent of the angular motion of the balance wheel is developed. A decrease in the angular swing of the balance wheel results in a greater time interval between the occurrence of the unlocking and drop sounds. Since a decrease in the angular swing of the balance wheel is, in fact, accompanied by a decrease in the rate of the balance wheel, there is a further spread in time between the unlocking and drop sounds. This factor is compensated for by proper calibration of the angular motion measuring apparatus.

Angular motion measuring apparatus of the type described above is well known and is sold in the United States under the trademark "Gradoscop" by the Vibrograf Corporation.

Two control signals, designated $I_d$ and $I_c$ and representing the unlocking and drop sounds, respectively, are developed at output lines 15 and 16, respectively, from the angular motion measuring apparatus 11. The control signals $I_d$ and $I_c$, in the form of pulses, are shown in waveforms a and b, respectively, in both FIGURES 2a and 2b.

The electrical signals developed by the microphone 10 are passed through a control circuit 20, to be described in more detail hereinafter, to a chronocomparator 17 of conventional construction and operation. The chronocomparator 17 is selectively responsive to one of the electrical signals developed by the microphone 10 as this signal is repeatedly developed once for each complete cycle of movement of the balance wheel under test. The chronocomparator 17 responding to this electrical signal develops, in the usual manner, an indication of the rate of the balance wheel. FIGURE 3b shows a typical chronocomparator rate recording for a balance wheel having an adequate angular motion.

The unlocking pulse $I_d$ is supplied along line 15 to a bistable multivibrator 21 of conventional construction and operation. The unlocking pulse $I_d$ changes the state of conductivity of the multivibrator 21 so that its output changes, for example, from 0 v. to −12 v. as shown in waveforms c in FIGURES 2a and 2b. At the same time, the unlocking pulse $I_d$ triggers a monostable multivibrator 22 also of conventional construction and operation. Multivibrator 22 develops a pulse, for example, of −12 v. amplitude such as the one shown in waveforms d in FIGURES 2a and 2b. This pulse serves as a reference time signal and will be referred to as $I_r$. The duration of pulse $I_r$ corresponds to a time interval between unlocking and drop sounds developed by a balance wheel having an adequate angular swing. The bistable multivibrator 21 is returned to its initial state of conductivity by the drop pulse $I_c$ supplied along line 16 and the output of the multivibrator 21 returns to 0 v. as shown in waveforms c of FIGURES 2a and 2b. The resulting pulse, designated as $I_m$, has a duration which corresponds to the time between the occurrence of the unlocking and drop sounds developed by the balance wheel under test. If the duration of the measured pulse $I_m$ is greater than the duration of pulse $I_r$, as illustrated in the waveforms of FIGURE 2a, the angular swing of the balance wheel under test is inadequate. If the duration of the measured pulse is equal to or less than the duration of pulse $I_r$, as illustrated in the waveforms of FIGURE 2b, the angular motion of the balance wheel under test is adequate.

The pulse $I_r$ is supplied from the multivibrator 22 to an inverter 23 of conventional construction and operation which simply inverts pulse $I_r$. The inverted pulse $\bar{I}_r$ is shown in waveforms e of FIGURES 2a and 2b.

The output signals from the multivibrator 21 and the inverter 23 are supplied to an AND circuit 24 of conventional construction and operation. The AND circuit 24 includes a plurality of diodes 25, 26 and 27 and a resistor 28 connected to a source of bias voltage of, for example, −12 v. The output of the inverter 23 is connected to diode 25, while the output of the multivibrator 21 is connected to diode 26. A blocking circuit 29, to be considered in more detail hereinafter, is connected to diode 27 by means of a wire 30. The level of the signal from the blocking circuit 29 on wire 30 is initially at −12 v., for example, as indicated by waveforms f of FIGURES 2a and 2b.

The AND circuit 24 serves to compare the duration of pulse $I_m$ of waveforms c with the duration of the reference pulse $I_r$ of waveforms d. Actually, the comparison is made between pulse $I_m$ and the inverted reference pulse $\bar{I}_r$. An examination of waveforms c, e and f of FIGURE 2a, which represent the three input signals to the AND circuit 24 shows that initially two of the input signals are at −12 v., while the third input signal, namely, pulse $I_m$, is at 0 v. With these input signals, the output of the AND circuit 24 is at 0 v. This is shown in waveform g in FIGURE 2a.

At the start of pulse $I_m$, the level of this input signal to AND circuit 24 drops to −12 v., while the inverted reference pulse $\bar{I}_r$ rises to 0 v. The output signal of the AND circuit 24 remains at 0 v., since one of the input signals, namely, pulse $\bar{I}_r$, is at 0 v. At the termination of the inverted reference pulse $\bar{I}_r$, this signal drops back to −12 v. Pulse $I_m$ is still at −12 v. as is the input signal to diode 27 on wire 30. With all the input signals to the AND circuit 24 at −12 v., the output signal of the AND circuit 24 drops to −12 v. as shown in waveform g of FIGURE 2a.

At the termination of pulse $I_m$, the output signal of the AND circuit 24 returns to 0 v. as shown in waveform g of FIGURE 2a since one of the input signals to the AND circuit, namely, pulse $I_m$, is at 0 v. The output pulse $I_a$ developed by the AND circuit 24 is supplied to a counter 31 of conventional construction and operation which, after a prescribed number of input pulses, triggers a monostable multivibrator 32 of conventional construction and operation. The output signal from multivibrator 32, in turn, causes the blocking circuit 29 to interrupt the passage of signals from the microphone 10 to the chronocomparator 17. This condition exists for the duration of the output signal from multivibrator 32, for example, one or two seconds. The result is that the chronocomparator 17 makes no rate measurements or rate recordings during this period so that the chronocomparator rate recording has spaces such as those designated by reference numeral 34 in FIGURE 3a. The blocking circuit 29 may be of conventional design and based upon simple electronic gating techniques. Normally, the blocking circuit 29 passes the signals from the microphone 10 to the chronocomparator 17. When activated by an output pulse from the multivibrator 32, the blocking circuit 29 is inhibited from passing the signals from the microphone to the chronocomparator for the duration of the pulse from the multivibrator 32.

At the time that the blocking circuit 29 interrupts the passage of signals from the microphone 10 to the chronocomparator 17, the level of the signal on line 30 rises to 0 v., as shown in waveform $f$ of FIGURE 2a, and remains at this level for the duration of the output signal from multivibrator 32. The output of the AND circuit 24 remains at 0 v. during the period that the level of the signal on wire 30 remains at 0 v. Although measured pulses $I_m$ and inverted reference pulses $\bar{I}_r$ are supplied to the AND circuit 24 during this period, no output pulses $I_a$ are developed by the AND circuit since the output of the AND circuit is held at 0 v. during this period by the signal on wire 30.

At the termination of the output pulse from multivibrator 32, the blocking circuit 29 again permits signals from the microphone 10 to pass to the chronocomparator 17 and the chronocomparator resumes normal operation. Also the level of the signal on wire 30 drops to −12 v., as shown in waveform $f$ of FIGURE 2a, so that the AND circuit 24 resumes comparisons of the pulses $I_m$ and $\bar{I}_r$ and the development of output pulses $I_a$ if pulse $I_m$ is longer than pulse $\bar{I}_r$.

Although the waveforms of FIGURE 2a depict only one comparison of pulses $I_m$ and $\bar{I}_r$ and shows the development of only one pulse $I_a$ by the AND circuit 24, it will be understood that prior to the blocking circuit 29 being actuated to interrupt the passage of signals from the microphone 10 to the chronocomparator 17, a prescribed number of comparisons of pulses $I_m$ and $\bar{I}_r$ are made and a prescribed number of pulses $I_a$ are developed before multivibrator 32 is triggered. The counter 31 is provided to insure that an indication that the measured pulse $I_m$ is greater than the reference pulse $I_r$ represents a steady condition rather than a possibly erroneous single occurrence. Eight comparisons causing eight consecutive output pulses $I_a$ would, for example, be a satisfactory number to signify a steady condition of an inadequate angular swing of the balance wheel.

If the measured pulse $I_m$ is of shorter duration than reference pulse $I_r$, at all times there is at least one input signal to AND circuit 24 at 0 v. This holds the output of AND circuit 24 at 0 v. as shown in waveform $g$ in FIGURE 2b. If no pulses $I_a$ are developed by the AND circuit 24, the counter 31 does not count nor is the multivibrator 32 triggered. Thus, the passage of signals from the microphone 10 to the chronocomparator 17 is not interrupted and the chronocomparator develops the usual rate recordings such as is shown in FIGURE 3b.

The duration of the reference pulse $I_r$ is preferably variable so that different timepiece movements having different characteristics may be tested. Variations in the duration of the reference pulse $I_r$ may be effected by varying the capacitors in multivibrator 22 which affect the timing of the multivibrator. In order to calibrate the reference pulse $I_r$, the output of inverter 23 is connected through a voltage divider having resistors 35 and 36, along a wire 37 and through switch 13 to the angular motion measuring apparatus 11 when switch 13 is positioned in contact with terminal 14b. An external triggering source is employed to set off the multivibrator 22. A differentiating circuit, within the angular motion measuring apparatus 11, is connected into the input circuit of the angular motion measuring apparatus to differentiate the reference pulse $I_r$ at its leading and trailing edges. The two pulses resulting from the differentiation are treated as unlocking and drop pulses by the angular motion measuring apparatus 11 so that an angular swing indication is developed for the particular duration of reference pulse $I_r$.

It should be noted that the various voltage levels shown in the waveforms of FIGURES 2a and 2b are merely illustrative of typical voltage levels which may be employed in the system of FIGURE 1. Other voltage levels may be employed with equal facility to achieve the desired results.

The timepiece testing apparatus of the present invention permits much flexibility and versatility in the arrangement of the component parts. For example, the control circuit 20 may be incorporated in the angular motion measuring apparatus 11 or in the chronocomparator 17. In addition, the control circuit 20 and the pulse generating portion of the angular motion measuring apparatus 11 which develops pulses $I_d$ and $I_c$ may form a single unit. Another possible arrangement is to incorporate the control circuit 20 and the angular motion measuring apparatus 11, in its entirety or only its pulse generating portion, in the chronocomparator. These various arrangements provide worthwhile and practical advantages in that common preamplifiers and power supplies may be employed.

While there has been described what is at present considered to be the preferred embodiment of this invention it will be obvious to those skilled in the art that various changes and modifications may be made therein without departing from the invention and it is, therefore, aimed to cover all such changes and modifications as fall within the true spirit and scope of the invention.

What is claimed is:

1. Timepiece testing apparatus comprising:
    means responsive to the sounds produced by the movement of a timepiece under test for developing electrical signals representative of said sounds;
    means selectively responsive to certain of said electrical signals for developing control signals spaced apart in time by intervals representative of the extent of the angular motion of said movement;
    means selectively responsive to certain of said electrical signals for measuring and recording the rate of said movement;
    and means for comparing the time intervals between said control signals with a reference time interval and for preventing said rate measuring and recording means from responding to said electrical signals for a prescribed period of time if the time intervals between said control signals are greater than said reference time interval.

2. Timepiece testing apparatus according to claim 1 wherein the sounds produced by the timepiece movement include the unlocking and drop sounds and the control signals are developed in response to the electrical signals representative of the unlocking and drop sounds.

3. Timepiece testing apparatus comprising:
    means responsive to the sounds produced by the movement of a timepiece under test for developing electrical signals representative of said sounds;
    means selectively responsive to certain of said electrical signals for developing control signals spaced apart in time by intervals representative of the extent of the angular motion of said movement;
    means for comparing the time intervals between said control signals with a reference time interval and for developing an output signal when the time interval between said control signals is greater than said reference time interval;
    means selectively responsive to certain of said electrical signals representative of said sounds for measuring and recording the rate of said movement;

and means responsive to said comparison means for passing said electrical signals representative of said sounds to said rate measuring and recording means and for preventing the passage of said electrical signals representative of said sounds for the duration of said output signal developed by said comparison means.

4. Timepiece testing apparatus comprising:

means responsive to the sounds produced by the movement of a timepiece under test for developing electrical signals representative of said sounds;

means selectively responsive to certain of said electrical signals for developing control signals spaced apart in time by intervals representative of the extent of the angular motion of said movement;

means responsive to said control signals for developing a first pulse having a duration equal to the time interval between said control signals;

means for developing a second pulse synchronized with said first pulse and having a duration corresponding to a reference time interval;

means for comparing said first and second pulses and for developing output signals each time that the duration of said first pulse is greater than the duration of said second pulse;

means for counting said output signals and for developing an inhibiting signal after a prescribed number of said output signals have been counted;

means selectively responsive to certain of said electrical signals representative of said sounds for measuring and recording the rate of said movement;

and means responsive to said counting means for passing said electrical signals representative of said sounds to said rate measuring and recording means and for preventing the passage of said electrical signals representative of said sounds for the duration of said inhibiting signal developed by said counting means.

5. Timepiece testing apparatus according to claim 4 wherein the electrical signals representative of the sounds produced by the timepiece movement are developed by a microphone and a chronocomparator measures and records the rate of said movement.

6. In apparatus for testing a timepiece having a periodically oscillating timing member, means for measuring the oscillation rate of said timing member and providing an indication of said rate, means for measuring the oscillation amplitude of said timepiece and producing an amplitude signal representative of said amplitude, reference means for providing a reference signal, comparison means for comparing said amplitude signal with said reference signal and producing an output signal when the condition exists in which said amplitude signal has a pre-determined relationship to said reference signal, and modifying means responsive to said output signal to modify the rate indication to indicate that said condition exists.

7. Testing apparatus as in claim 6 in which said rate indication is a visual graphic presentation, and in which said modifying means interrupts said graphic presentation.

8. Testing apparatus as in claim 6 in which the pre-determined relationship between said reference signal and said amplitude signal is one in which said amplitude signal has a parameter which is less than a corresponding parameter of said reference signal.

9. Testing apparatus as in claim 6 in which said output signal is produced once for every oscillation of said timing member during the existence of said condition, and including counting control means for counting said output signals and producing a modifying signal in said rate indicating means only when a pre-determined number of said output signals has been counted.

References Cited

UNITED STATES PATENTS

| | | | |
|---|---|---|---|
| 3,183,706 | 4/1965 | Ellison | 73—6 |
| 3,238,764 | 3/1966 | Greiner | 73—6 |
| 3,255,625 | 6/1966 | Ellison | 73—6 |

S. CLEMENT SWISHER, *Acting Primary Examiner.*

NEIL B. SIEGEL, *Assistant Examiner.*